US012657206B1

(12) United States Patent
Ahluwalia et al.

(10) Patent No.: US 12,657,206 B1
(45) Date of Patent: Jun. 16, 2026

(54) PERFORMING COMMIT OPERATIONS WITH RECOVERY ON DATA SYSTEM

(71) Applicant: Snowflake Inc., Bozeman, MT (US)

(72) Inventors: Rishabh Singh Ahluwalia, Bellevue, WA (US); Abhishek Jayaprakash Bakare, Bellevue, WA (US); Yi Fang, Kirkland, WA (US); Wei-An Huang, Bellevue, WA (US); Nithin Mahesh, Redmond, WA (US); Eric Maynard, San Mateo, CA (US); Krishna B. Nibhanupudi, Shoreline, WA (US); Maninderjit Singh Parmar, Kirkland, WA (US); Sahaj Saini, Seattle, WA (US); Rikinkumar Shah, Sammamish, WA (US); Di Fei Zhang, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/280,694

(22) Filed: Jul. 25, 2025

(51) Int. Cl.
 *G06F 16/27* (2019.01)
 *G06F 16/23* (2019.01)

(52) U.S. Cl.
 CPC .......... *G06F 16/27* (2019.01); *G06F 16/2379* (2019.01)

(58) Field of Classification Search
 None
 See application file for complete search history.

(56) References Cited

U.S. PATENT DOCUMENTS

| | | | | |
|---|---|---|---|---|
| 10,114,857 | B1 * | 10/2018 | Nikitina | ................. G06N 20/00 |
| 11,429,595 | B2 * | 8/2022 | Vishwakarma | ... G06F 16/24552 |

| | | | | |
|---|---|---|---|---|
| 2002/0082953 | A1 * | 6/2002 | Batham | .............. G06Q 30/0625 |
| | | | | 707/E17.116 |
| 2008/0222159 | A1 * | 9/2008 | Aranha | .................... G06F 16/21 |
| 2010/0114817 | A1 * | 5/2010 | Broeder | ................ G06F 16/289 |
| | | | | 707/612 |
| 2015/0319265 | A1 * | 11/2015 | DeRoo | .................... G06F 9/466 |
| | | | | 709/217 |
| 2020/0356449 | A1 * | 11/2020 | Bensberg | ............ G06F 11/1474 |
| 2024/0012715 | A1 * | 1/2024 | Wu | ....................... G06F 11/1464 |
| 2025/0258808 | A1 * | 8/2025 | Aluc | .................... G06F 16/2358 |

FOREIGN PATENT DOCUMENTS

| | | | | |
|---|---|---|---|---|
| CN | 120030029 A | * | 5/2025 | ............... G06F 8/31 |

OTHER PUBLICATIONS

Cadambe, Viveck R., and Shihang Lyu. "CausalEC: A causally consistent data storage algorithm based on cross-object erasure coding." arXiv preprint arXiv:2102.13310 (2021). (Year: 2021).*

* cited by examiner

*Primary Examiner* — Uyen T Le

(74) *Attorney, Agent, or Firm* — Schwegman Lundberg & Woessner, P.A.

(57) ABSTRACT

Various example embodiments described herein provide for systems, methods, devices, instructions, and the like for performing commit operations (e.g., write operations) with recovery on a data system, such as a database system, that is interacting with a data source external to the data system, such as an external catalog. For some example embodiments, the database system generates an operation identifier in association with each command to commit a change to an entity of the catalog linked database, where the operation identifier serves as a unique tracking mechanism for commit operations across the distributed systems.

20 Claims, 5 Drawing Sheets

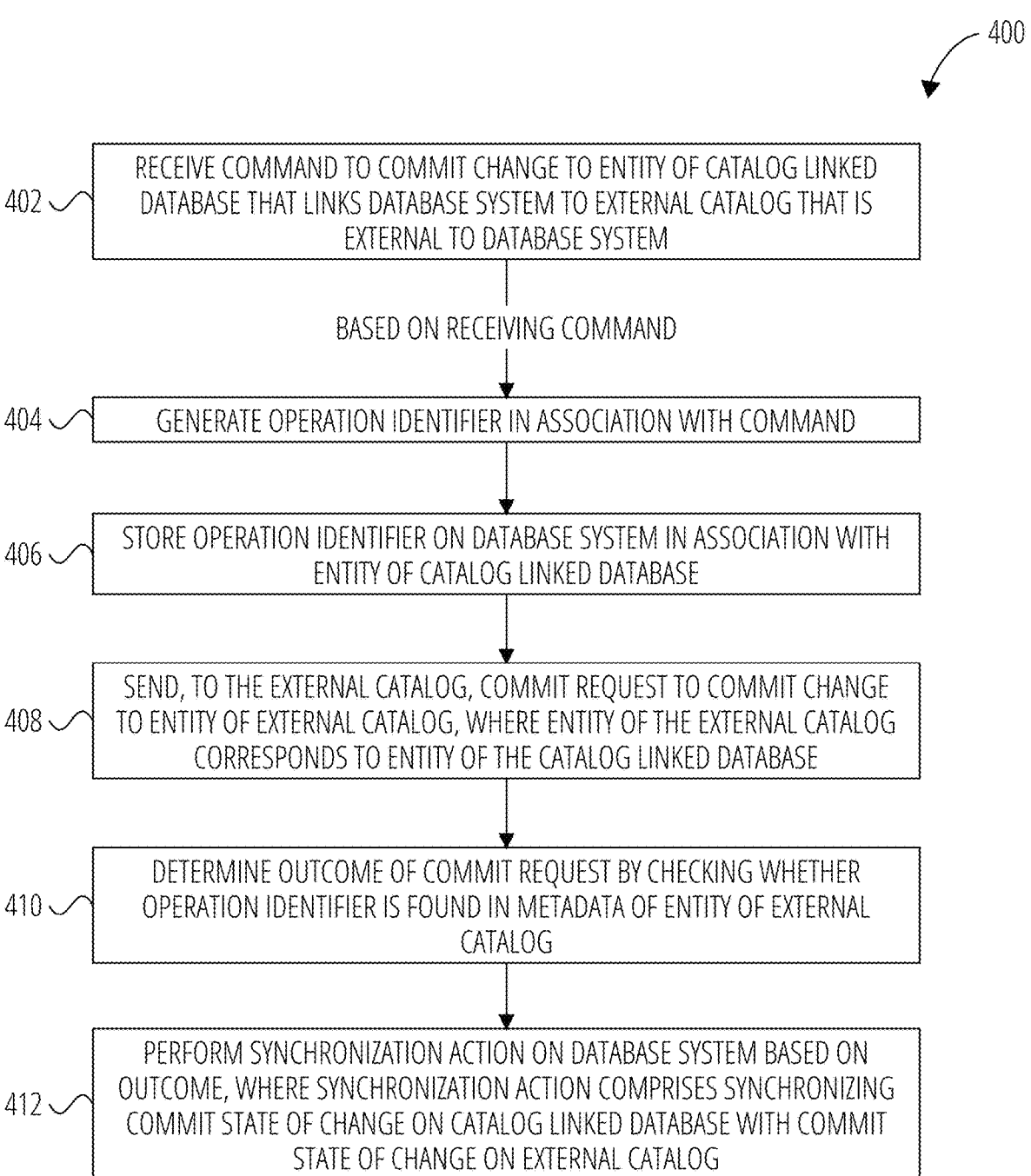

400

402 — RECEIVE COMMAND TO COMMIT CHANGE TO ENTITY OF CATALOG LINKED DATABASE THAT LINKS DATABASE SYSTEM TO EXTERNAL CATALOG THAT IS EXTERNAL TO DATABASE SYSTEM

BASED ON RECEIVING COMMAND

404 — GENERATE OPERATION IDENTIFIER IN ASSOCIATION WITH COMMAND

406 — STORE OPERATION IDENTIFIER ON DATABASE SYSTEM IN ASSOCIATION WITH ENTITY OF CATALOG LINKED DATABASE

408 — SEND, TO THE EXTERNAL CATALOG, COMMIT REQUEST TO COMMIT CHANGE TO ENTITY OF EXTERNAL CATALOG, WHERE ENTITY OF THE EXTERNAL CATALOG CORRESPONDS TO ENTITY OF THE CATALOG LINKED DATABASE

410 — DETERMINE OUTCOME OF COMMIT REQUEST BY CHECKING WHETHER OPERATION IDENTIFIER IS FOUND IN METADATA OF ENTITY OF EXTERNAL CATALOG

412 — PERFORM SYNCHRONIZATION ACTION ON DATABASE SYSTEM BASED ON OUTCOME, WHERE SYNCHRONIZATION ACTION COMPRISES SYNCHRONIZING COMMIT STATE OF CHANGE ON CATALOG LINKED DATABASE WITH COMMIT STATE OF CHANGE ON EXTERNAL CATALOG

FIG. 4

PERFORMING COMMIT OPERATIONS WITH RECOVERY ON DATA SYSTEM

TECHNICAL FIELD

Embodiments described herein relate to data systems and, more particularly, to systems, methods, devices, and instructions for performing commit operations with recovery on a data system, such as a database system, that is interacting with a data source external to the data system, such as an external catalog.

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application programming interface (API).

BRIEF DESCRIPTION THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 4 is a flowchart of an example method for performing commit operations with recovery on a database system that is interacting with an external catalog, according to some example embodiments of the present disclosure.

DETAILED DESCRIPTION

Figure 1:
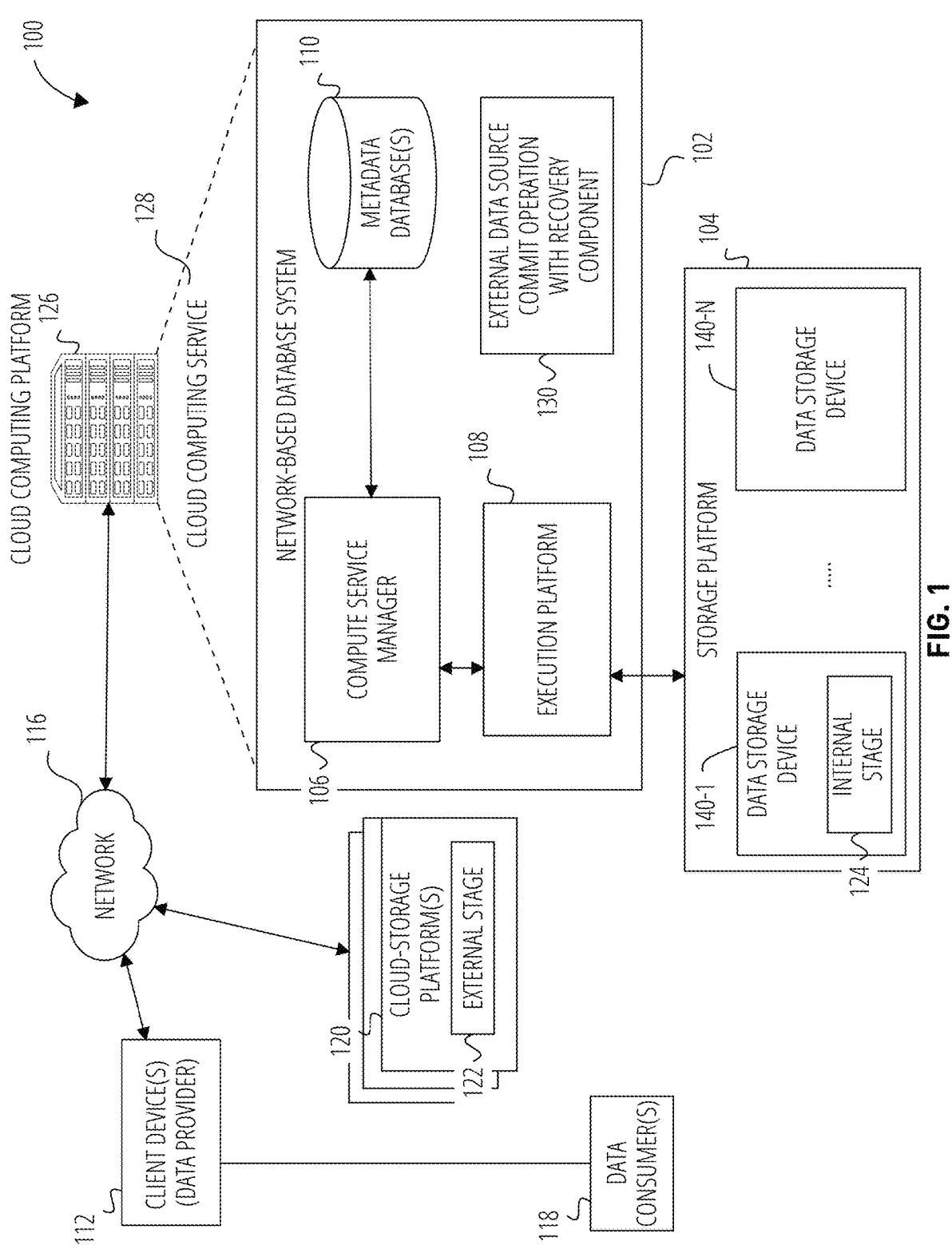
FIG. 1 illustrates an example computing environment comprising a database system in the example form of a network-based database system that includes an external data source commit operation with recovery component, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Apache Iceberg™ is a specification describing an open-source software (OSS) table format that provides capabilities for managing large analytic datasets. In particular, the table format defined by the Apache Iceberg™ specification enables consistent data access across various computing engines and platforms and allows a data engineer to manage table-like datasets stored in Apache Parquet™ files on blob storage or some other format (e.g., CSV, avro etc.). A table having a table format provided by Apache Iceberg™ can be referred to herein as an Iceberg table. Generally, the open-table format of Apache Iceberg™ allows a database system to operate on the data stored in an Iceberg table in a transactionally consistent way, without contacting a database or copying data from a database. An Iceberg table can include three components: the data (e.g., stored in Apache Parquet™ format or another format), metadata (e.g., which represents what part of the data is in a certain snapshot), and a catalog.

As used herein, a catalog can comprise a data management structure configured as a single pane used to determine which tables (e.g., Iceberg tables) of a database are the latest snapshots that can be queried, what data is committed or can be committed to a table (e.g., Iceberg table) of a database, or discover data assets that are available via a table (e.g., an Iceberg table) of a database. Tasks such as creating, dropping, and renaming tables are the functionalities associated with a catalog. In this regard, the catalog can provide a single pane to manage a collection of tables grouped into one or more namespaces, including discovering available tables, discovering and managing their metadata, and being the authority on tracking and committing table snapshots (or versions).

Traditional database systems face challenges when coordinating operations across one or more external catalogs (e.g., remote catalog). In particular, a database system must maintain consistency while executing commit operations (e.g., write operations) with one or more external catalogs, which may be accessed by the database system over unreliable networks. Generally, a catalog can serve as a system of record for table metadata and manage access to underlying data. These catalogs can be managed by different vendors or third parties, introducing complexity when coordinating database operations across system boundaries. While traditional database systems can rely on transaction protocols to ensure data consistency, when working with external catalogs, network failures, system crashes, or temporary outages can interrupt operations (e.g., commit operations, such as write operations) from database systems to external catalogs before completion. This can create uncertainty about the final state of attempted operations. Additionally, traditional database systems often need to track operation status and maintain specialized metadata for features like statistics collection and access control—this metadata must remain synchronized even when failures occur during processing.

Various example embodiments described herein provide for systems, methods, devices, instructions, and the like for performing commit operations (e.g., write operations) with recovery on a data system, such as a database system, that is interacting with a data source external to the data system, such as an external catalog. As used herein, a catalog linked database (CLD) is an object on a database system that links the database system to an external catalog (e.g., external Apache Iceberg™ catalog, such as an Iceberg REST catalog) that is external to the database system, where the catalog linked database can operate on the database system as a representation of the external catalog on the database system. An entity, such as a table, view, or schema, of the catalog linked database can represent a corresponding entity of the external catalog. A catalog linked database can facilitate access of (e.g., facilitate reading data from or writing data to) the external catalog on the database system, where a catalog linked database can enable automatic synchronization between the database system and the external catalog. As used herein, an external catalog comprises a catalog hosted on a system (e.g., a third-party vendor or an external system) that is external to and remote from the database system, where the remote external system manages the external catalog.

For some example embodiments, the database system generates an operation identifier in association with each command to commit a change to an entity of the catalog linked database, where the operation identifier serves as a unique tracking mechanism for commit operations (e.g., write operations) across the distributed systems. A command to commit a change to an entity (e.g., table, view, schema, or namespace) can include, without limitation, a command that includes one or more data manipulation language (DML) operations, a command that includes one or more data definition language (DDL) operations, a command to create, register, drop, or rename a table, and a command to create, drop, or update a namespace. According to some example embodiments, the operation identifier is added to entity properties (e.g., table properties) for all commit operations (e.g., write operations) to entities (e.g., tables, views, schemas, namespaces, and the like). For instance, for DML operations, the operation identifier can also be added to snapshot summaries to enable distinction between different operations within the same database engine instance. In various example embodiments, the operation identifier is unique for each commit operation (e.g., each commit operation and database engine) that makes changes to the external catalog entity. In this way, various example embodiments provide tolerance to concurrent modifications to the same table by different database engines while supporting both DDL and DML operations.

With respect to a commit operation performed on an entity of a catalog linked database on the database system, the database system of some example embodiments persists the operation identifier in metadata of the entity of the catalog linked database before attempting to commit a change to a corresponding entity on the external catalog. This can enable verification of commit operation outcomes by checking for the existence of the operation identifier in the external catalog's metadata in case of failures during commit operations. For various example embodiments, the database system generates (e.g., constructs) a commit operation by adding an operation identifier to an entity property (e.g., table property) or schema property, by adding the operation identifier to a snapshot summary for operation that modify metadata, or by adding the operation identifier to an entity property for a direct catalog call. According to some example embodiments, the database system sends a commit request to the external catalog comprising the operation identifier (e.g., commit request can request addition of the operation identifier as a table property), and determines an outcome of the commit request by checking whether the operation identifier is found in metadata of the entity of the external catalog.

In some example embodiments, the database system implements a comprehensive control flow where each database operation is assigned a unique operation identifier (e.g., corresponding to each commit API or catalog API call), where the operation identifier can be generated when beginning a transaction, such as a transaction workspace. According to some example embodiments, the transaction is applied atomically on the external catalog, which implies that the transaction comprises only one operation call corresponding to one operation identifier. For various example embodiments, the database system stores database-specific metadata using the same operation identifier before making changes visible, attempts the commit operation on the external catalog with the operation identifier stored as part of the commit operation on the external catalog, and makes decisions based on the outcome of the commit (e.g., outcome of the commit API or catalog API call).

Various example embodiments implement retry mechanisms and status resolution procedures when the outcome of a commit request cannot be immediately determined. For some example embodiments, when the commit status is unknown, the database system retries a predetermined number of times to resolve the status and either transitions to a failed state or a success state. According to some example embodiments, if the retries are unable to resolve the status, the entity is placed in a recovery state and another action, such as the synchronization action, is scheduled to resolve the unknown status at a later time. In some example embodiments, the synchronization action comprises a refresh operation (e.g., load table operation) that brings the database system's state into synchronization with the external catalog (e.g., by identifying unresolved operation identifiers and applying changes from the external catalog metadata to the database system metadata).

For various example embodiments, the database system implements different handling procedures based on the type of operation being performed. Some example embodiments support DML operations where the operation identifier is added to both table properties and snapshot summaries, and DDL operations where the operation identifier is added only to table properties. According to some example embodiments, the database system handles different operations (e.g., table creation, table registration, table dropping, table renaming, namespace creation, namespace dropping, and namespace property updates), with each type of operation having a corresponding synchronization action for recovery purposes.

In some example embodiments, the operation identifier comprises a structured format that includes a common prefix identifying the database system as the source of the commit request, a hash value corresponding to at least one of a deployment identifier, an account identifier, or an entity identifier, and a timestamp component indicating when the commit request was generated. Various example embodiments generate the hash value to ensure that each operation can identify and clean up only previous operations from the same database system instance (e.g., deployment-accountentity instance), which is important for safely deleting operation identifiers only when it is confirmed that they correspond to committed operations. For some example embodiments, the operation identifier includes a version component, which can allow for evolving the operation identifier schema over time.

According to some example embodiments, the database system implements cleanup mechanisms (e.g., to maintain optimal metadata size) by removing operation identifiers that correspond to completed transactions. For various example embodiments, during a subsequent commit request to the external catalog, the database system identifies one or more operation identifiers previously stored in the metadata of the external catalog, determines whether the corresponding transactions are in terminal states, and causes removal of operation identifiers for completed transactions from the metadata of the external catalog. Some example embodiments implement cleanup strategies that include gathering table properties with matching prefixes, checking transaction states using timestamp and entity information, and deleting stale operation identifiers while preserving active or pending transaction identifiers.

In some example embodiments, the database system handles various failure scenarios, which can include, without limitation, short-term external catalog unavailability, long-term external catalog unavailability, and database system crashes. Various example embodiments place the catalog linked database into a recovery mode when the external catalog is unavailable, where limited operations are permitted until connection with the external catalog is reestablished and all pending workspaces are moved to terminal states. For some example embodiments, the system implements job recovery mechanisms that can distinguish between failures that occur before attempting to commit to the external catalog and failures that occur after commit attempts, with different recovery procedures applied based on the failure timing.

According to some example embodiments, the database system maintains transaction workspace status progression through defined states including, for example, started, failure, unknown/unresolved, needs catchup, and success states. For various example embodiments, the database system transitions between these states based on operation progress, where operations that fail before attempting to commit to the external catalog result in failure status, operations with unknown commit status on the external catalog result in unknown/unresolved status, and operations where commits succeed but synchronization actions fail result in the "needs catchup" status. Some example embodiments complete the recovery process when all transactions (e.g., transaction workspaces) associated with a database are moved to terminal states, ensuring consistency between the database system and the external catalog.

Though various example embodiments are described herein with respect to a database system interacting with an external catalog, it will be understood that some example embodiments implement the methodologies described herein with respect to other types of external data sources. For example, techniques described herein could be applied to interactions with Hadoop™ file systems (e.g., Hadoop™ file system-based catalogs), other table formats such as one according to a Delta Lake™ specification, or any catalog implementation that supports a REST specification of Apache Iceberg™.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes an external data source commit operation with recovery component 130, according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other example embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
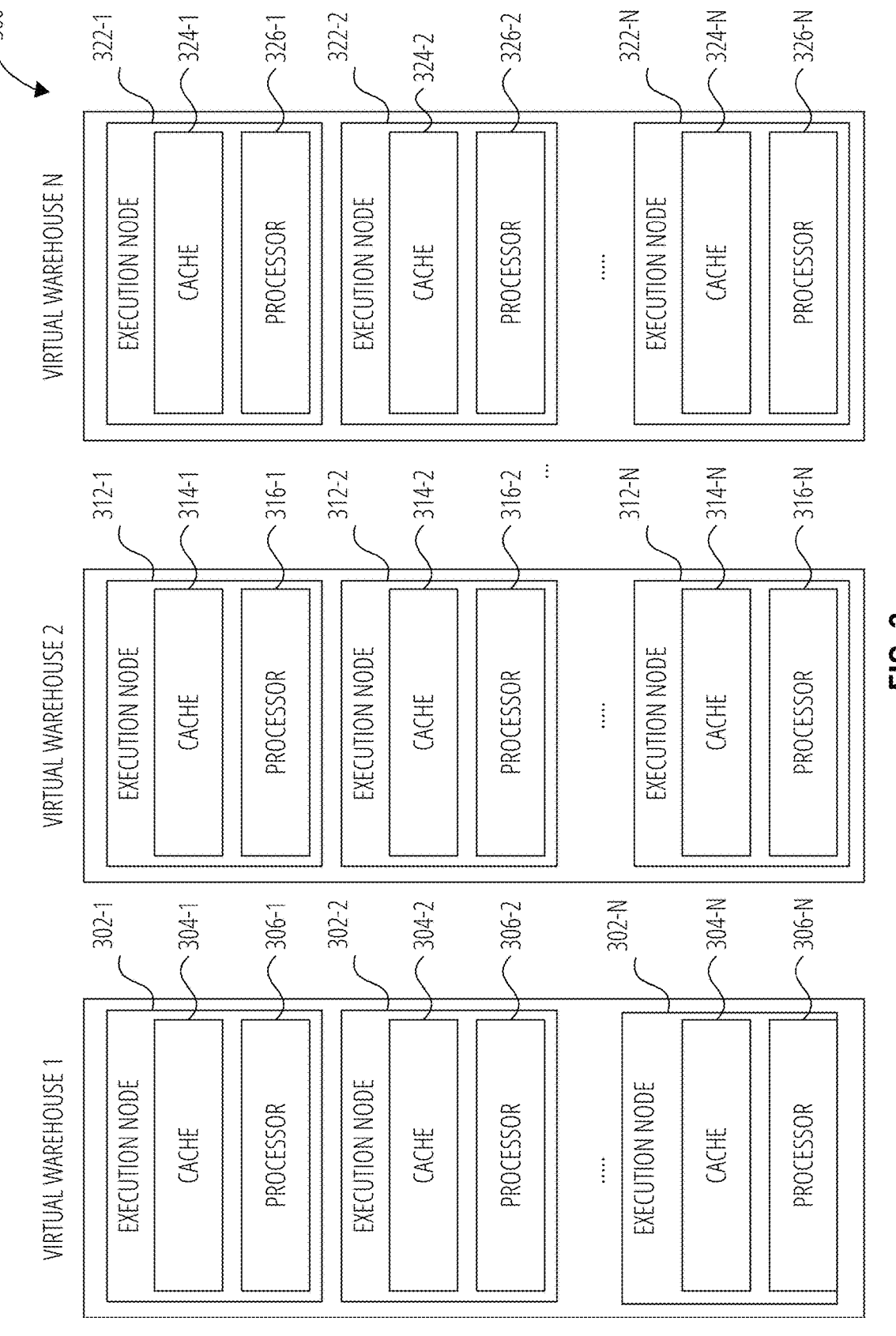
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises the external data source commit operation with recovery component 130 that enables or facilitates performance of commit operations (e.g., write operations) with recovery on the network-based database system 102 with respect to a data source external to the network-based database system 102, such as an external catalog (e.g., remote catalog) hosted on a system external to the network-based database system 102, in accordance with various example embodiments. For example, the external catalog can be hosted on another network-based database system not shown in FIG. 1.

Figure 2:
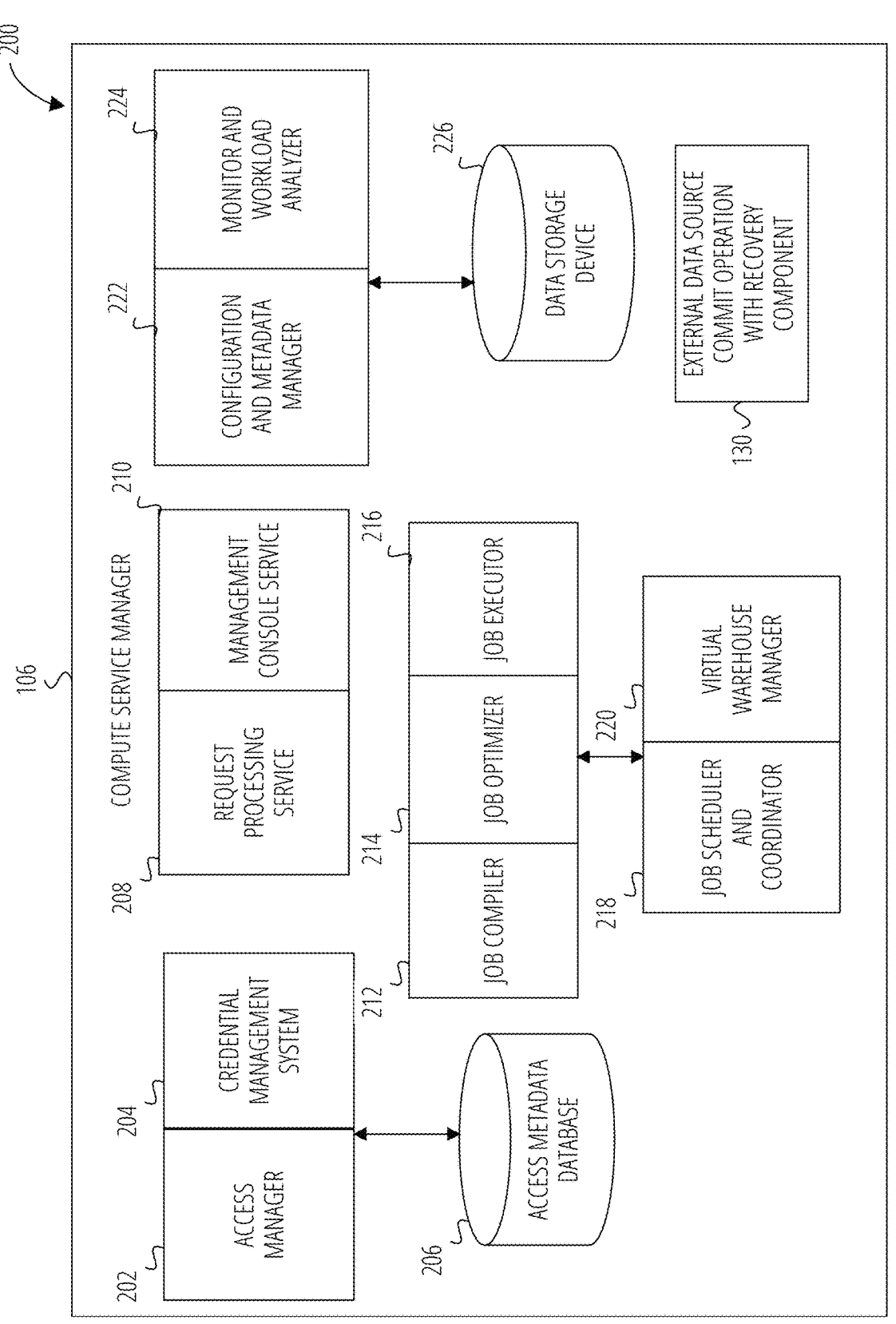
FIG. 2 is a block diagram illustrating components of a compute service manager, according to some example embodiments of the present disclosure.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As shown, the compute service manager 106 includes the external data source commit operation with recovery component 130, which can enable the compute service manager 106 to implement one or more features for performing commit operations (e.g., write operations) with recovery on the network-based database system 102 with respect to a data source external to the network-based database system 102, such as a catalog external to the network-based database system 102.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault-tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

FIG. 4 is a flowchart of an example method 400 for performing commit operations with recovery on a database system that is interacting with an external catalog, according to some example embodiments of the present disclosure. Method 400 may be embodied in computer-readable instructions for execution by one or more hardware components (e.g., one or more processors) such that the operations of method 400 can be performed by components of the network-based database system 102, such as a network node (e.g., the external data source commit operation with recovery component 130 executing on a network node of the compute service manager 106), one or both of which may be implemented as machine 500 of FIG. 5 performing the disclosed functions. Accordingly, method 400 is described below, by way of example with reference thereto. However, it shall be appreciated that method 400 may be deployed on various other hardware configurations and is not intended to be limited to deployment within the network-based database system 102.

At operation 402, a processor (e.g., implementing the external data source commit operation with recovery component 130) receives a command to commit a change to an entity of a catalog linked database that links the database system to an external catalog that is external to the database system. The entity can include, without limitation, a table, a view, a schema, a namespace, or the like. The external catalog can be compliant with a REST specification of Apache Iceberg™. The external catalog can be one selected from a group comprising of Apache Polaris™, AWS™ Glue, Hive Metastore, Hadoop Catalog filesystem-based catalog, and the like.

According to some example embodiments, the catalog linked database provides a linking mechanism that enables the database system to interact with and manage entities stored in the external catalog while maintaining synchronization between the database system and an external system hosting/managing the external catalog. Depending on the example embodiment, the command to commit the change to the entity can comprise, for example, a command to write target data to the entity, or a command to create, drop, or modify the entity (e.g., table or view).

According to various example embodiments, based on the processor receiving the command to commit the change to the entity of the catalog linked database, method 400 continues to operation 404. During operation 404, the processor generates an operation identifier in association with the command. For example, the write operation identifier can be generated at the beginning of a transaction call and is associated with a transaction (e.g., a transaction workspace). According to various example embodiments, the operation identifier comprises an identifier (e.g., alphanumeric value) that is unique to the commit request from the database system (e.g., unique from other operation identifiers within the database system, or unique from operation identifiers across multiple database systems that interact with the external catalog). Depending on the example embodiment, the operation identifier can comprise at least one of: a common prefix identifying the database system as a source of the commit request; a hash value corresponding to at least one of a deployment identifier, an account identifier, or an entity identifier of the entity of the catalog linked database; or a timestamp component indicating when the commit request was generated by the database system. For example, the operation identifier can comprise a key, which is a concatenation of a hash value based on one or more identifiers associated with the database system (e.g., hash (deploymentId.accountId.tableId)) and a commit transaction start time (e.g., hash (deploymentId.accountId.tableId).txnStartTime). The hashed value can ensure that each commit transaction can identify and clean up only previous jobs from the same database system instance (e.g., deployment-account-table instance). The table identifier (e.g., tableId) can be different for each table instance of the same external catalog. The inclusion of the hash can ensure that each instance only cleans up after itself. The transaction start time can be concatenated to ensure the uniqueness of the operation identifier so that jobs can be properly recovered. Further, the operation identifier can include (e.g., a prefix of) a common identifier, such as a version number associated with the database system (e.g., snowflake.operation.version.hash (deploymentId.accountId.tableId).txnStartTime).

An example of the operation identifier being added to metadata of the entity of external catalog as a table property is illustrated in Table 1.

TABLE 1

```
{
"format-version" : 2,
"table-uuid" : "a57ce2c2-b8f3-49a7-a436-7dd417e96338",
. . .
"properties": { "created-at": . . .
"snowflake.operation.1.hasedValue.txnStartTime":
{"ts":"1001"},
"snowflake.operation.1.hasedValue2.txnStartTime2": {"ts":"100
2"},
}
```

An example of the operation identifier being added to the metadata of the entity of an external catalog as a snapshot summary is illustrated in Table 2.

TABLE 2

```
{
"format-version" : 2,
"table-uuid" : "a57ce2c2-b8f3-49a7-a436-7dd417e96338",
. . .
"snapshots": [
{
"snapshot-id": 123, "summary": {
"snowflake.operation.1.hasedValue.txnStartTime":
{"ts":"1001"} ,
. . .
},
{
```

TABLE 2-continued

```
"sequence-number": 2,
"snapshot-id": 124, "summary": {
"snowflake.operation.1.hasedValue.txnStartTime2":
{"ts":"1002"} ,
. . .
},
. . .
}]
. . .
}
```

For operation 406, the processor stores the operation identifier on the database system in association with the entity of the catalog linked database. For instance, the processor can store the operation identifier in metadata on the database system, such as the metadata associated with the entity of the catalog linked database on the database system. According to various example embodiments, the operation identifier is stored on the database system in association with the entity of the catalog linked database without making the stored operation identifier visible. Additionally, the operation identifier is stored on the database system in association with the entity of the catalog linked database without applying the change to the entity of external catalog, or at least without making the change to the entity of external catalog visible. According to various example embodiments, the storing of the operation identifier on the database system is performed before the sending of the commit request to the external catalog is performed. The storage of the operation identifier on the database system can enable the database system to maintain a record of the operation identifier locally, which can facilitate recovery operations and synchronization verification in subsequent operations of the method. For various example embodiments, operation 406 is performed as part of a commit operation performed on the database system to commit the change on the entity of the catalog linked database (based on the command). According to various example embodiments, this commit operation on the database system does not apply the change to (or at least make it visible on) the entity of the catalog linked database without a confirmation from the external catalog that the change has been successfully committed on the external catalog.

During operation 408, the processor sends, to the external catalog, a commit request to commit the change to an entity of the external catalog, where the entity of the external catalog corresponds to the entity of the catalog linked database. The commit request can be sent by the processor by way of a commit API call or a catalog API call (e.g., REST API call). The commit request can represent an attempt by the database system to commit the change (requested by the command received during operation 402) to the external catalog. According to some example embodiments, the commit request comprises the operation identifier generated in operation 404. The operation identifier can be stored as an entity property (e.g., table property). For various example embodiments, the commit request comprises a request to add (e.g., attach) the operation identifier to the metadata of the entity of the external catalog. Additionally, for some example embodiments, the commit request comprises a request to cause the operation identifier to be added to a snapshot summary for an operation (e.g., DML operation) that modifies metadata. In some example embodiments, the commit request comprises either a DML operation (e.g., writing target data to a table of the external catalog via a corresponding table of the catalog linked database) or a data definition language (DDL) operation (e.g., creating or modifying a schema of a table of the external catalog via a corresponding table of the catalog linked database).

At operation 410, the processor determines an outcome of the commit request by checking whether the operation identifier is found in metadata of the entity of the external catalog. For instance, the metadata provided by the external catalog to the database system can comprise a JavaScript Object Notation (JSON) object. The metadata received by the database system can comprise (e.g., described or list the values of) one or more properties of at least the entity of the external catalog. For some example embodiments, the checking of whether the operation identifier is stored in metadata of the entity of the external catalog comprises requesting and receiving, from the external catalog, the metadata of the entity of the external catalog. Alternatively, or additionally, the metadata can be returned (e.g., automatically returned) to the database system in response to the commit request sent from the database system to the external catalog (during operation 408). For various example embodiments, determining the outcome of the commit request comprises determining that the outcome of the commit request is successful (e.g., commit state of the change is success) based on the operation identifier being found (e.g., found to be stored) in the metadata of the entity of the external catalog, or determining that the outcome of the commit request is unsuccessful (e.g., commit state of the change is failure) based on the operation identifier not being found (e.g., not found to be stored) in the metadata of the entity of the external catalog.

Depending on the example embodiment, the operation identifier can be found to be stored, in the metadata of the entity of the external catalog, as an entity property (e.g., table property) of the entity of the external catalog. This can occur where the commit operation comprises a DML operation (e.g., for writing target data to a table) or a DDL operation (e.g., for defining or modifying a schema). Additionally, the operation identifier can be found stored in a snapshot summary provided by the external catalog (e.g., in response to the commit request sent to the external catalog). This can occur where the commit operation comprises a DML operation.

According to some example embodiments, the checking comprises sending, to the external catalog, a metadata request for the metadata of the entity of the external catalog (e.g., request for properties of the entity of the external catalog), detecting whether the metadata request fails, and retrying the sending of the metadata request based on determining that the metadata request fails. A failure could occur, for example, as a result of a network error during communication between the database system and the external catalog, the external catalog can crash or become unavailable, the database system can crash during the commit operation, or the database system's credential or access to the external catalog expires during the commit operation. While the database system is unable to obtain the metadata of the entity of the external catalog, the commit state of the change on the external catalog can be considered to be unknown. After the processor retries the sending of the metadata request a predetermined number of times, the processor can determine that the outcome of the commit request is unsuccessful. Alternatively, after the processor retries the sending of the metadata request a predetermined number of times, the processor can transition the commit request to an unknown status, and schedule a synchronization action to resolve the unknown status at a later time (e.g., when the external catalog become available again).

During operation 412, the processor performs a synchronization action on the database system based on the outcome, where the synchronization action comprises synchronizing a commit state of the change on the catalog linked database with a commit state of the change on the external catalog. According to some example embodiments, performing the synchronization action on the database system based on the outcome comprises determining whether the outcome (determined during operation 410) indicates that the commit request is successful, and based on (e.g., in response to) determining that the outcome indicates that the commit request is successful, causing one or more changes to the entity of the external catalog to be applied to the entity of the catalog linked database based on the metadata of the entity of the external catalog, where the one or more changes comprise the change to the entity of the external catalog caused by the commit request (and corresponding to the operation identifier). The one or more changes can be applied to the entity of the catalog linked database, for example, by performing (e.g., triggering) a refresh of the entity of the catalog linked database based on the metadata of the entity of the external catalog. The refresh of the entity of the catalog linked database can cause the one or more changes to the entity of the external catalog to be visible in the entity of the catalog linked database. For some example embodiments, after causing the one or more changes to the entity of the external catalog to be applied to the entity of the catalog linked database, the processor causes removal of the operation identifier stored in the metadata of the entity of the catalog linked database. This removal of the operation identifier can prevent accumulation of operation identifier metadata that could otherwise slow down subsequent operations on the database system (e.g., with respect to the catalog linked database).

For some example embodiments, the removal of an operation identifier corresponding to a successful commit on the external catalog is performed during a subsequent commit transaction between the catalog linked database and the external catalog. For example, where the commit request is a recently-completed commit request, during a subsequent commit request to the external catalog, the processor can identify one or more operation identifiers previously stored in the metadata of the external catalog that correspond to commit transactions completed on the external catalog. The processor can then remove the one or more (identified) operation identifiers from the metadata of the external catalog. This cleanup process according to various example embodiments helps maintain the efficiency and organization of the metadata storage system while ensuring that historical operation identifiers do not accumulate unnecessarily over time.

How the one or more changes to the entity of the external catalog are applied to the entity of the catalog linked database (based on the metadata of the entity of the external catalog) can vary based on the operation specified by the received command. For example, where the received command comprises a DML operation or a DDL operation, the synchronization action can comprise performing a refresh of the entity of the catalog linked database. Where the received command comprises creating or registering a table, the synchronization action can comprise creating a corresponding table on the catalog linked database and performing a refresh of the created table. Where the received command comprises dropping a table, the synchronization action can comprise dropping a corresponding table from the catalog linked database. Where the received command comprises renaming a table, the synchronization action can comprise renaming a corresponding table of the catalog linked database. Where the received command comprises creating a namespace, the synchronization action can comprise creating a corresponding namespace on the catalog linked database. Where the received command comprises dropping a namespace, the synchronization action can comprise dropping a corresponding namespace from the catalog linked database. Where the received command comprises updating a namespace, the synchronization action can comprise performing an update of a corresponding namespace of the catalog linked database.

For some example embodiments, the performing of the synchronization action on the database system based on the outcome comprises determining whether the outcome indicates that the commit request is unsuccessful. Based on (e.g., in response to) determining that the outcome indicates that the commit request is unsuccessful, the processor can avoid committing (e.g., applying) the change specified by the received command to the entity of the catalog linked database and can cause removal of the operation identifier stored in the metadata of the entity of the catalog linked database. By removing the operation identifier stored in the metadata of the entity of the catalog linked database without causing the change to be committed (e.g., applied) to the entity of the catalog linked database, the processor can clean up the metadata of the catalog linked database and can effectively rollback the effects of the received command on the catalog linked database-side. For various example embodiments, only operation identifiers corresponding to active commit transactions (e.g., ones currently being executed or with unknown commit statuses) are retained in the metadata of the catalog linked databases.

Figure 5:
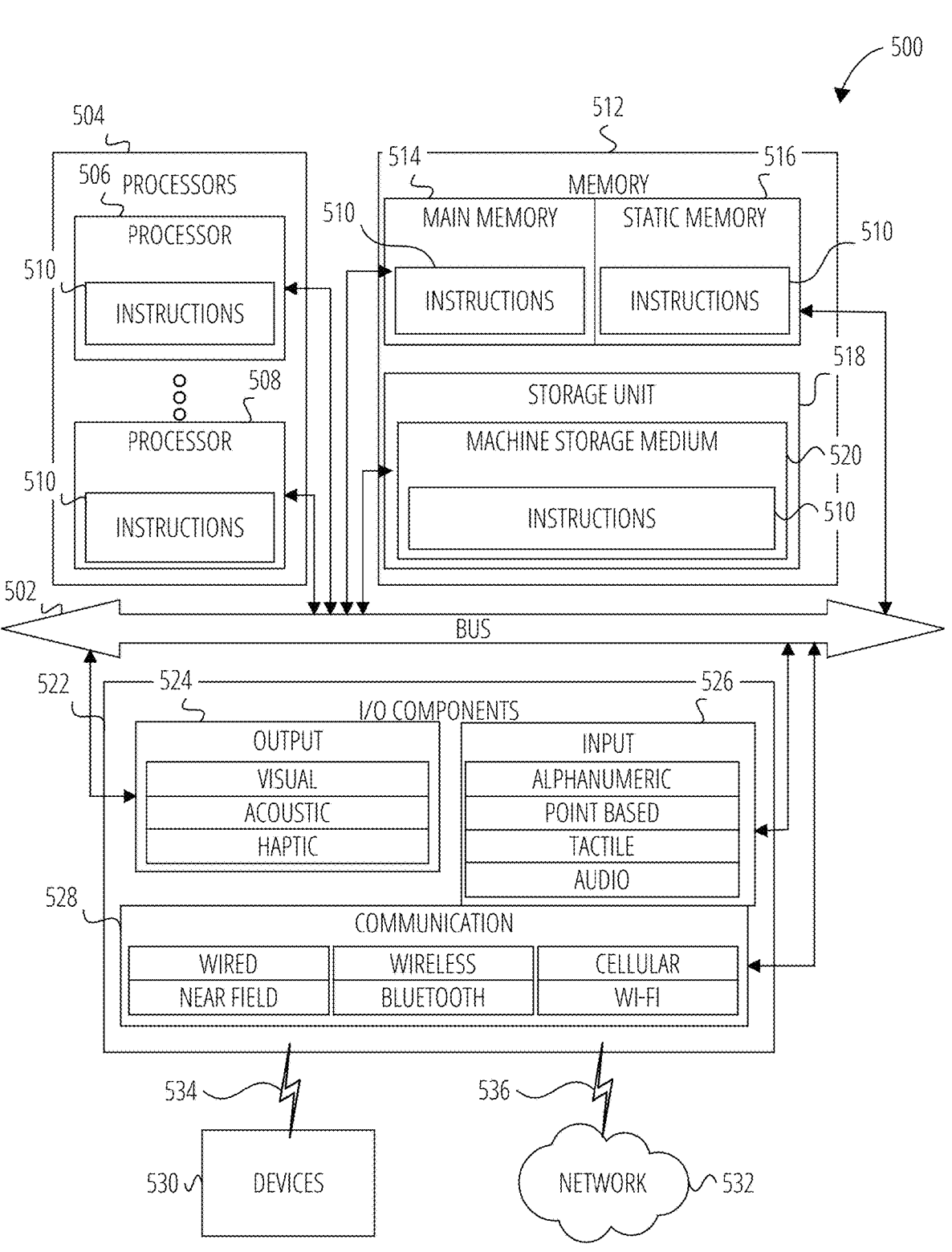
FIG. 5 illustrates a diagrammatic representation of a machine in the form of a computer system within which a set of instructions can be executed for causing the machine to perform any one or more of the methodologies discussed herein, according to some example embodiments of the present disclosure.

FIG. 5 illustrates a diagrammatic representation of a machine 500 in the form of a computer system within which a set of instructions can be executed for causing the machine 500 to perform any one or more of the methodologies discussed herein, according to some example embodiments of the present disclosure. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein can be executed. For example, the instructions 510 may cause the machine 500 to execute any one or more operations of any one or more of the methods described herein. As another example, the instructions 510 may cause the machine 500 to implement portions of the data flows described herein. In this way, the instructions 510 transform a general, non-programmed machine into a particular machine 500 (e.g., the compute service manager 106, the execution platform 108, client device 112) that is specially configured to carry out any one of the described and illustrated functions in the manner described herein.

In alternative embodiments, the machine 500 operates as a standalone device or can be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines machine 500 that individually or jointly execute the instructions 510 to perform any one or more of the methodologies discussed herein.

The machine 500 includes processors 504, memory 512, and input/output (I/O) components 522 configured to communicate with each other such as via a bus 502. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 506 and a processor 508 that may execute the instructions 510. The term "processor" is intended to include multi-core processors 504 that may comprise two or more independent processors (sometimes referred to as "cores") that may execute instructions 510 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 512 may include a main memory 514, a static memory 516, and a storage unit 518, all accessible to the processors 504 such as via the bus 502. The main memory 514, the static memory 516, and the storage unit 518 comprising a machine storage medium 520 may store the instructions 510 embodying any one or more of the methodologies or functions described herein. The instructions 510 may also reside, completely or partially, within the main memory 514, within the static memory 516, within the storage unit 518, within at least one of the processors 504 (e.g., within the processor's cache memory), or any suitable combination thereof, during execution thereof by the machine 500.

The I/O components 522 include components to receive input, provide output, produce output, transmit information, exchange information, capture measurements, and so on. The specific I/O components 522 that are included in a particular machine 500 will depend on the type of machine. For example, portable machines such as mobile phones will likely include a touch input device or other such input mechanisms, while a headless server machine will likely not include such a touch input device. It will be appreciated that the I/O components 522 may include many other components that are not shown in FIG. 5. The I/O components 522 are grouped according to functionality merely for simplifying the following discussion and the grouping is in no way limiting. In various example embodiments, the I/O components 522 may include output components 524 and input components 526. The output components 524 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 522 may include communication components 528 operable to couple the machine 500 to a network 532 via a coupling 536 or to devices 530 via a coupling 534. For example, the communication components 528 may include a network interface component or another suitable device to interface with the network 532. In further examples, the communication components 528 may include wired communication components, wireless communication components, cellular communication components, and other communication components to provide communication via other modalities. The devices 530 can be another machine or any of a wide variety of peripheral devices (e.g., a peripheral device coupled via a universal serial bus (USB)). For example, as noted above, the machine 500 may correspond to any client device, the compute service manager 106, the execution platform 108, and the devices 530 may include any other of these systems and devices.

The various memories (e.g., 512, 514, 516, and/or memory of the processor(s) 504 and/or the storage unit 518) may store one or more sets of instructions 510 and data structures (e.g., software) embodying or utilized by any one or more of the methodologies or functions described herein. These instructions 510, when executed by the processor(s) 504, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 532 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 532 or a portion of the network 532 may include a wireless or cellular network, and the coupling 536 can be a Code Division Multiple Access (CDMA) connection, a Global System for Mobile communications (GSM) connection, or another type of cellular or wireless coupling. In this example, the coupling 536 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 510 can be transmitted or received over the network 532 using a transmission medium via a network interface device (e.g., a network interface component included in the communication components 528) and utilizing any one of a number of well-known transfer protocols (e.g., hypertext transfer protocol (HTTP)). Similarly, the instructions 510 can be transmitted or received using a transmission medium via the coupling 534 (e.g., a peer-to-peer coupling) to the devices 530. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 510 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other example embodiments the processors may be distributed across several locations.

Described implementations of the subject matter can include one or more features, alone or in combination as illustrated below by way of examples.

Example 1 is a database system comprising: at least one processor; and at least one memory storing instructions that cause the at least one processor to perform operations comprising: receiving a command to commit a change to a first entity of a catalog linked database that links the database system to an external catalog that is external to the database system; and based on receiving the command: generating an operation identifier in association with the command; sending, to the external catalog, a commit request to commit the change to a second entity of the external catalog, the second entity of the external catalog corresponding to the first entity of the catalog linked database, the commit request comprising the operation identifier; determining an outcome of the commit request by checking whether the operation identifier is found in metadata of the second entity of the external catalog; and performing a synchronization action on the database system based on the outcome, the synchronization action comprising synchronizing a commit state of the change on the catalog linked database with a commit state of the change on the external catalog.

In Example 2, the subject matter of Example 1 includes, wherein the operations comprise: after the generating of the operation identifier, storing the operation identifier on the database system in association with the first entity of the catalog linked database.

In Example 3, the subject matter of Example 2 includes, wherein the storing is performed before the sending of the commit request to the external catalog is performed.

In Example 4, the subject matter of Examples 1-3 includes, wherein the command to commit the change to the entity comprises either a command to write target data to the entity, or a command to create, drop, or modify the entity.

In Example 5, the subject matter of Examples 1-4 includes, wherein the commit request comprises a request to add the operation identifier to the metadata of the second entity of the external catalog.

In Example 6, the subject matter of Examples 1-5 includes, wherein the checking of whether the operation identifier is stored in metadata of the second entity of the external catalog comprises: requesting and receiving, from the external catalog, the metadata of the second entity of the external catalog.

In Example 7, the subject matter of Examples 1-6 includes, wherein the checking of whether the operation identifier is stored in metadata of the second entity of the external catalog comprises: sending, to the external catalog, a metadata request for the metadata of the second entity of the external catalog; detecting whether the metadata request fails; and retrying the sending of the metadata request based on determining that the metadata request fails.

In Example 8, the subject matter of Example 7 includes, wherein the retrying of the sending of the request comprises: after the retrying of the sending of the metadata request a predetermined number of times, determining that the outcome of the commit request is unsuccessful.

In Example 9, the subject matter of Examples 7-8 includes, wherein the retrying of the sending of the request comprises: after the retrying of the sending of the metadata request a predetermined number of times: transitioning the commit request to an unknown status; and scheduling the synchronization action to resolve the unknown status at a later time.

In Example 10, the subject matter of Examples 1-9 includes, wherein the determining of the outcome of the commit request comprises: determining that the outcome of the commit request is successful based on the operation identifier being found in the metadata of the second entity of the external catalog.

In Example 11, the subject matter of Examples 1-10 includes, wherein the determining of the outcome of the commit request comprises: determining that the outcome of the commit request is unsuccessful based on the operation identifier not being found in the metadata of the second entity of the external catalog.

In Example 12, the subject matter of Examples 1-11 includes, wherein the performing of the synchronization action on the database system based on the outcome comprises: determining whether the outcome indicates that the commit request is unsuccessful; and based on determining that the outcome indicates that the commit request is unsuccessful, causing removal of the operation identifier stored in the metadata of the first entity of the catalog linked database.

In Example 13, the subject matter of Examples 1-12 includes, wherein the performing of the synchronization action on the database system based on the outcome comprises: determining whether the outcome indicates that the commit request is successful; and based on determining that the outcome indicates that the commit request is successful, causing one or more changes to the second entity of the external catalog to be applied to the first entity of the catalog linked database based on the metadata of the second entity of the external catalog, the one or more changes comprising the change to the second entity of the external catalog caused by the commit request.

In Example 14, the subject matter of Example 13 includes, wherein the performing of the synchronization action on the database system based on the outcome comprises: based on determining that the outcome indicates that the commit request is successful and after the causing of the one or more changes to the second entity of the external catalog to be applied to the first entity of the catalog linked database, causing removal of the operation identifier stored in the metadata of the first entity of the catalog linked database.

In Example 15, the subject matter of Examples 1-14 includes, wherein the commit request comprises either a data manipulation language (DML) operation or a data definition language (DDL) operation.

In Example 16, the subject matter of Examples 1-15 includes, wherein the operation identifier comprises an identifier that is unique to the commit request from the database system.

In Example 17, the subject matter of Examples 1-16 includes, wherein the operation identifier comprises at least one of: a common prefix identifying the database system as a source of the commit request; a hash value corresponding to at least one of a deployment identifier, an account identifier, or an entity identifier of the first entity of the catalog linked database; or a timestamp component indicating when the commit request was generated by the database system.

In Example 18, the subject matter of Examples 1-17 includes, where the commit request is a recently-completed commit request, and wherein the operations comprise: during a subsequent commit request to the external catalog: identifying one or more operation identifiers previously stored in the metadata of the external catalog, the one or more operation identifiers corresponding to commit transactions completed on the external catalog; and causing removal of the one or more operation identifiers from the metadata of the external catalog.

Example 19 is a method to implement any of Examples 1-18.

Example 20 is a machine-storage medium storing instructions that when executed by a machine, cause the machine to perform operations to implement any of Examples 1-18.

Although the example embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other example embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other example embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A database system comprising:

at least one processor; and at least one memory storing instructions that cause the at least one processor to perform operations comprising:

receiving a command to commit a change to a first entity of a catalog linked database that links the database system to an external catalog that is external to the database system; and based on receiving the command:

generating a unique operation identifier in association with the command;

sending, from the database system to the external catalog, a commit request to commit the change to a second entity of the external catalog, the second entity of the external catalog corresponding to the first entity of the catalog linked database, the commit request comprising the unique operation identifier;

determining an outcome of the commit request by checking whether the unique operation identifier is found in metadata of the second entity of the external catalog, the metadata of the second entity of the external catalog being received from the external catalog; and performing a synchronization action on the database system based on the outcome, the synchronization action comprising synchronizing a commit state of the change on the catalog linked database with a commit state of the change on the external catalog.

2. The database system of claim 1, wherein the operations comprise:

after the generating of the unique operation identifier, storing the unique operation identifier on the database system in association with the first entity of the catalog linked database.

3. The database system of claim 2, wherein the storing is performed before the sending of the commit request to the external catalog is performed.

4. The database system of claim 1, wherein the command to commit the change to the entity comprises either a command to write target data to the entity, or a command to create, drop, or modify the entity.

5. The database system of claim 1, wherein the commit request comprises a request to add the unique operation identifier to the metadata of the second entity of the external catalog.

6. The database system of claim 1, wherein the checking of whether the unique operation identifier is found in metadata of the second entity of the external catalog comprises:

requesting and receiving, from the external catalog, the metadata of the second entity of the external catalog.

7. The database system of claim 1, wherein the checking of whether the unique operation identifier is found in metadata of the second entity of the external catalog comprises:

sending, from the database system to the external catalog, a metadata request for the metadata of the second entity of the external catalog;

detecting whether the metadata request fails; and retrying the sending of the metadata request based on determining that the metadata request fails.

8. The database system of claim 7, wherein the retrying of the sending of the request comprises:

after the retrying of the sending of the metadata request a predetermined number of times, determining that the outcome of the commit request is unsuccessful.

9. The database system of claim 7, wherein the retrying of the sending of the request comprises:

after the retrying of the sending of the metadata request a predetermined number of times:

transitioning the commit request to an unknown status; and scheduling the synchronization action to resolve the unknown status at a later time.

10. The database system of claim 1, wherein the determining of the outcome of the commit request comprises:

determining that the outcome of the commit request is successful based on the unique operation identifier being found in the metadata of the second entity of the external catalog.

11. The database system of claim 1, wherein the determining of the outcome of the commit request comprises:

determining that the outcome of the commit request is unsuccessful based on the unique operation identifier not being found in the metadata of the second entity of the external catalog.

12. The database system of claim 1, wherein the performing of the synchronization action on the database system based on the outcome comprises:

determining whether the outcome indicates that the commit request is unsuccessful; and based on determining that the outcome indicates that the commit request is unsuccessful, causing removal of the unique operation identifier stored in the metadata of the first entity of the catalog linked database.

13. The database system of claim 1, wherein the performing of the synchronization action on the database system based on the outcome comprises:

determining whether the outcome indicates that the commit request is successful; and based on determining that the outcome indicates that the commit request is successful, causing one or more changes to the second entity of the external catalog to be applied to the first entity of the catalog linked database based on the metadata of the second entity of the external catalog, the one or more changes comprising the change to the second entity of the external catalog caused by the commit request.

14. The database system of claim 13, wherein the performing of the synchronization action on the database system based on the outcome comprises:

based on determining that the outcome indicates that the commit request is successful and after the causing of the one or more changes to the second entity of the external catalog to be applied to the first entity of the catalog linked database, causing removal of the unique operation identifier stored in the metadata of the first entity of the catalog linked database.

15. The database system of claim 1, wherein the commit request comprises either a data manipulation language (DML) operation or a data definition language (DDL) operation.

16. The database system of claim 1, wherein the unique operation identifier comprises an identifier that is unique to the commit request from the database system.

17. The database system of claim 1, wherein the unique operation identifier comprises at least one of:

a common prefix identifying the database system as a source of the commit request;

a hash value corresponding to at least one of a deployment identifier, an account identifier, or an entity identifier of the first entity of the catalog linked database; or a timestamp component indicating when the commit request was generated by the database system.

18. The database system of claim 1, wherein the commit request is a first commit request, and wherein the operations comprise:

after a second commit request is sent from the database system to the external catalog:

identifying one or more unique operation identifiers that are currently stored in metadata provided by the external catalog and that are corresponding to commit transactions determined to be in terminal state on the external catalog based on timestamp and entity information; and causing removal of one or more unique operation identifiers from the metadata of the external catalog.

19. A method comprising:

receiving, by at least one processor of a database system, a command to commit a change to a first entity of a catalog linked database that links the database system to an external catalog that is external to the database system; and based on receiving the command:

generating, by the at least one processor, a unique operation identifier in association with the command;

sending, from the database system to the external catalog, by the at least one processor, a commit request to commit the change to a second entity of the external catalog, the second entity of the external catalog corresponding to the first entity of the catalog linked database, the commit request comprising the unique operation identifier;

determining, by the at least one processor, an outcome of the commit request by checking whether the unique operation identifier is found in metadata of the second entity of the external catalog, the metadata of the second entity of the external catalog being received from the external catalog; and performing, by the at least one processor, a synchronization action on the database system based on the outcome, the synchronization action comprising synchronizing a commit state of the change on the catalog linked database with a commit state of the change on the external catalog.

20. A machine-storage medium storing instructions that when executed by a machine operating a database system, cause the machine to perform operations comprising:

receiving a command to commit a change to a first entity of a catalog linked database that links the database system to an external catalog that is external to the database system; and based on receiving the command:

generating a unique operation identifier in association with the command;

sending, from the database system to the external catalog, a commit request to commit the change to a second entity of the external catalog, the second entity of the external catalog corresponding to the first entity of the catalog linked database, the commit request comprising the unique operation identifier;

determining an outcome of the commit request by checking whether the unique operation identifier is found in metadata of the second entity of the external catalog, the metadata of the second entity of the external catalog being received from the external catalog; and performing a synchronization action on the database system based on the outcome, the synchronization action comprising synchronizing a commit state of the change on the catalog linked database with a commit state of the change on the external catalog.

* * * * *